United States Patent
Yu (10) Patent No.: US 12,423,964 B2
(45) Date of Patent: Sep. 23, 2025

(54) INTELLIGENT SYSTEM FOR DETERMINING HEMP BY HEADSPACE CHEMICAL ANALYSIS

(71) Applicant: Sam Houston State University, Huntsville, TX (US)

(72) Inventor: Chi Chung Yu, Conroe, TX (US)

(73) Assignee: SAM HOUSTON STATE UNIVERSITY, Huntsville, TX (US)

( * ) Notice: Subject to any disclaimer, the term of this patent is extended or adjusted under 35 U.S.C. 154(b) by 384 days.

(21) Appl. No.: 17/706,524

(22) Filed: Mar. 28, 2022

(65) Prior Publication Data

US 2022/0309777 A1    Sep. 29, 2022

Related U.S. Application Data (60) Provisional application No. 63/166,619, filed on Mar. 26, 2021.

(51) Int. Cl.
*G06V 10/80* (2022.01)
*G06V 10/82* (2022.01)

(52) U.S. Cl.
CPC .................... *G06V 10/82* (2022.01)

(58) Field of Classification Search
CPC ..... G06V 10/82; G06V 10/454; G06V 10/774
See application file for complete search history.

(56) References Cited

U.S. PATENT DOCUMENTS

| 2011/0299035 A1* | 12/2011 | Suehira | A61B 3/102 |
| | | | 356/497 |
| 2019/0033210 A1* | 1/2019 | Yarden | B07C 5/342 |
| 2021/0381961 A1* | 12/2021 | Smith | G01N 33/0098 |
| 2023/0196560 A1* | 6/2023 | Koh | G06V 10/25 |
| | | | 382/286 |

FOREIGN PATENT DOCUMENTS

| CN | 104568152 | * | 4/2015 |
| WO | WO 2019/092836 | * | 5/2019 |

OTHER PUBLICATIONS

Machine translation for CN 104568152 (Year: 2015).*
Ilias et al., "Extraction and analysis of different Cannabis samples by headspace solid-phase microextraction combined with gas chromatography-mass spectrometry", Journal of Separation Science, 2005, 28, 2293-2300 (Year: 2005).*
Machine translation for WO 2019/092836 (Year: 2019).*
Wiebelhaus et al., "Differentiation of marijuana headspace volatiles from other plants and hemp products using capillary microextraction of volatiles (CMV) coupled to gas-chromatography-mass spectrometry (GC—MS)", Forensic Chemistry 2 (2016) 1-8 (Year: 2016).*

* cited by examiner

*Primary Examiner* — Qian Yang
(74) *Attorney, Agent, or Firm* — Kowert, Hood, Munyon, Rankin & Goetzel, P.C.; Gareth M. Sampson (57) ABSTRACT

System and methods for hemp determination of a *cannabis* sample are disclosed. The systems and methods may include obtaining headspace data of *cannabis* samples using a gas chromatography/mass spectrometer (GC/MS) device. The data may then be transformed into images based on retention time, scan range, and signal intensities in the data for assessment by a convolutional network to determine whether a *cannabis* sample is hemp or non-hemp.

18 Claims, 8 Drawing Sheets

FIG. 1

(Examples of GC/MS chemical images created from HS-SPME-GC/MS analysis of Placebo marijuana and marijuana plant samples)

FIG. 2

(Construction of images from GC/MS data to facilitate the deep learning process for hemp samples determination)

FIG. 3

$$Accuracy = \frac{(True\ Positives + True\ Negatives)}{(True\ Positives + True\ Negatives + False\ Positives + False\ Negatives)}$$

(Preliminary headspace-GC/MS testing on four different hemp plant materials. Terpenes, chlorophyll, and cannabinoids may be readily separated and identified from the described approach)

FIG. 6

(A typical total ion chromatogram (TIC) of rapid headspace-GC/MS test for a hemp plant sample. CBD, THC, and CNB are readily detectable by sampling 250 μL of headspace vapor from 40 mg hemp sample in 10 mL headspace sample vials)

INTELLIGENT SYSTEM FOR DETERMINING HEMP BY HEADSPACE CHEMICAL ANALYSIS

PRIORITY CLAIM

This application claims priority to U.S. Provisional Patent Appl. No. 63/166,619 to Yu, filed Mar. 26, 2021, which is incorporated by reference as if fully set forth herein.

BACKGROUND

1. Field of the Invention

The disclosed embodiments generally relate to systems and methods used for determining chemical features of hemp using convolutional neural networks. Specific embodiments relate to determining between hemp and marijuana in samples in the field or laboratory.

2. Description of the Relevant Art

The 2018 United States farm bill of Dec. 20, 2018 made hemp an ordinary agricultural commodity in the United States. According to the farm bill, hemp is defined as *cannabis* with less than 0.3% THC (tetrahydrocannabinol). *Cannabis* containing more than 0.3% THC is still a Schedule 1 controlled substance under federal law. Thus, determining the THC content of *cannabis* is useful for differentiating between ordinary agricultural commodities and controlled substances.

Typical methods for determining the THC content of *cannabis* include liquid extraction of THC from a *cannabis* sample using solvents. Therefore, there is a need for non-destructive, non-solvent based methods for determining THC content in *cannabis* samples.

BRIEF DESCRIPTION OF THE DRAWINGS

Embodiments disclosed herein are not limited to any specific devices. The drawings described herein are for illustration purposes only and are not intended to limit the scope of the embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION OF THE PREFERRED EMBODIMENTS

Embodiments disclosed herein present a system and method for determining the THC content of *cannabis* samples. Specific embodiments implement machine learning algorithms (e.g., convolutional neural networks) to determine whether the THC content of a *cannabis* sample is above or below a predetermined threshold. In certain embodiments, the predetermined threshold is a threshold that differentiates between hemp and non-hemp *cannabis*.

The concentration levels of THC (tetrahydrocannabinol) and CBD (cannabidiol) in *cannabis* plant materials typically range from below 0.1% to 10%, or even higher. The present disclosure recognizes that a sufficient amount of THC and CBD can be rapidly detected from a sample headspace without the use of additional adsorption traps, such as SPME (solid-phase microextraction) fibers or Tenax sorbent tubes. In various embodiments, a headspace-GC/MS (gas chromatography/mass spectrometer) hemp determination workflow may be developed in a forensic laboratory where a GC/MS is commonly equipped. For example, ground-truth samples (e.g., hemp plant materials with known levels of THC and CBD) can be obtained and used to train a machine learning model (e.g., convolutional neural network (CNN)) to create an AI (artificial intelligence) model for the automatic determination of hemp samples. In various embodiments, performance of AI in determining hemp samples may be evaluated by a random selection of known hemp and non-hemp samples. False-positive and false-negative rates of the new approach may also be determined to refine AI performance. In some embodiments, the sample size, headspace vial size, sampling temperature, and sampling volume of GC/MS may be optimized to improve the analytical performance of headspace-GC/MS for hemp plant materials. It is noted that THC and other cannabinoids are nonvolatile organic chemicals. Thus, in some embodiments, a rapid headspace sampling procedure may utilize a thermostat to heat the sample vials before sampling headspace for GC/MS by using an air-tight syringe.

In some embodiments, standard hemp samples are analyzed by both HPLC (high-pressure liquid chromatography) and headspace-GC/MS for comparison. Because THC levels might increase due to decarboxylation of THCA (tetrahydrocannabinolic acid) or isomerization of CBD, the HPLC test may be implemented for common cannabinoids without issues related to heating the sample. It is believed that a rapid heated-headspace sampling procedure should not alter the levels of THC in the samples. Comparing testing using the HPLC dataset and headspace-GC/MS dataset from the same variety of hemp samples may be used to verify that the rapid heated-headspace sampling procedure does not alter the levels of THC. Ground-truth hemp datasets may be used for these comparisons.

For comparison, a headspace-GC/MS dataset may be processed by both a traditional approach and the AI (CNN) approach. The traditional approach includes a calibration method using peak areas of THC in the total ion chromatograms (TIC) or extracted ion chromatograms (EIC) using phenanthrene or stable isotope-labeled THC as an internal standard. The calibration method that produces a better calibration range for THC may be implemented for comparison to the AI (CNN) approach. In some embodiments, deuterated-THC may be used as an internal standard for quantitative analysis of THC. The use of deuterated-THC may, however, be less preferable as its use increases the cost for each test and the test of hemp and marijuana is not a trace chemical analysis. In various embodiments, the use of phenanthrene as an internal standard may be sufficient to quantify THC at milligram levels. The calculated THC percentage measured by headspace-GC/MS can be compared to the HPLC method to determine the accuracy and precision of headspace-GC/MS.

AI (artificial intelligence) systems that automatically interpret chemical signals are becoming available and popular for structure elucidation and the automation of analytical data analysis. The use of chemical attributes for evidence source tracing has been known as chemical forensics. The present disclosure describes AI systems for hemp determination. In certain embodiments, measurement data from a headspace sampling by GC/MS is transformed into one or more images for assessment by an AI system (e.g., a CNN). In some embodiments, headspace GC/MS data (e.g., GC/MS signals) is mathematically transformed into one or more images. For instance, Matlab or another commercially available program with a deep learning toolbox may be implemented for the transformation of headspace GC/MS data into images.

In certain embodiments, headspace GC/MS data is transformed based on retention time, mass scan range, and signal intensity in the data. For example, retention time, scan range, and signal intensities may be extracted from the headspace GC/MS data and these features may be used to generate the one or more images. In some embodiments, the signal intensity is normalized using an internal standard before generating the one or more images.

Figure 1:
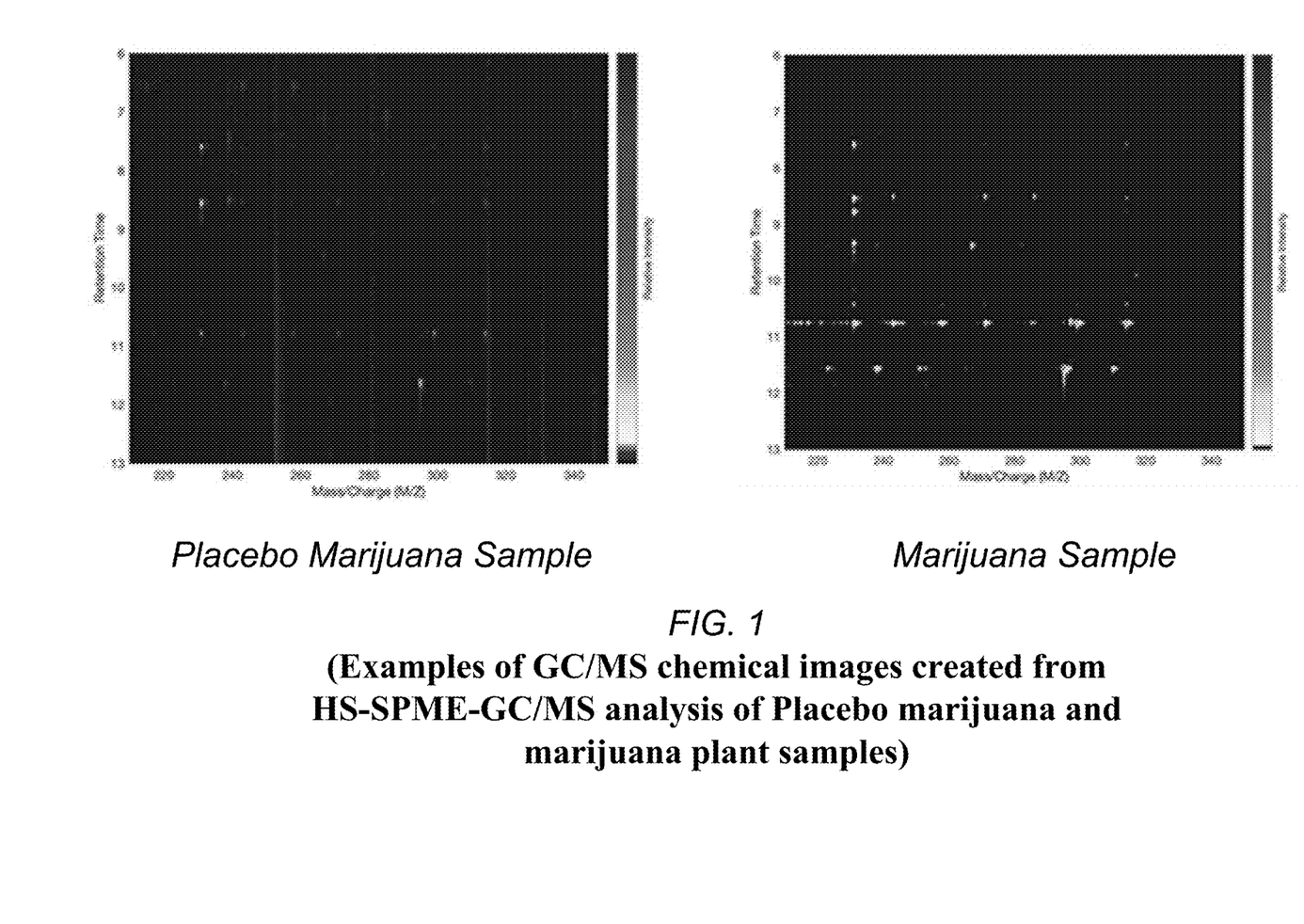
FIG. 1 depicts examples of images generated from GC/MS data for a placebo marijuana sample and a marijuana sample.

FIG. 1 depicts examples of images generated from GC/MS data for a placebo marijuana sample and a marijuana sample. Images, such as those depicted in FIG. 1, may be assessed using an AI model such as a CNN to determine chemical information for the GC/MS data without using a conventional GC/MS data analysis approach that determines chemical information for each peak in the GC/MS data. In certain embodiments, CNN assessment of such images may determine whether a *cannabis* sample is a hemp sample or a marijuana (non-hemp) sample.

In various embodiments, a deep learning model such as CNN is trained to recognize chemical features representing hemp and non-hemp images as constructed from their headspace-GC/MS data. For example, the CNN may be trained to recognize THC content in reference images generated from GC/MS data of *cannabis* samples. In some embodiments, the reference images include images generated from ground-truth hemp data. As such, the CNN may be trained to recognize chemical features in the reference images to determine whether a sample is hemp or non-hemp.

In certain embodiments, a CNN is trained to assess one or more images generated from GC/MS data for a *cannabis* sample and determine whether the *cannabis* sample is hemp or non-hemp (e.g., non-marijuana or marijuana). For example, the CNN may be trained to determine whether the THC content is above or below a predetermined threshold (e.g., above or below 0.3% THC) based on the images themselves, which may be a threshold differentiating between hemp and non-hemp. Using CNN to determine whether a *cannabis* sample is hemp or non-hemp can be implemented in a variety of environments. For instance, CNN analysis may be implemented in forensic laboratory applications and/or field-deployable platforms.

In various embodiments, headspace data obtained by headspace-GC/MS may be processed using the following steps:

1. Data export: GC/MS data may be saved in a .CDF format, which can be processed in a Matlab environment.
2. Transform GC/MS data into images: As described above, retention time, scan range, and signal intensities in the GC/MS data may be extracted to generate images for each *cannabis* sample. Signal intensity may be normalized by an internal standard before generating the images.
3. Intelligent data analysis using deep learning: A deep learning neural network, using a CNN, may be implemented for feature extraction and pattern analysis of the generated images to determine hemp/non-hemp properties of the *cannabis* samples. In certain embodiments, ground-truth hemp data is used for training the deep learning neural network.

Figure 2:
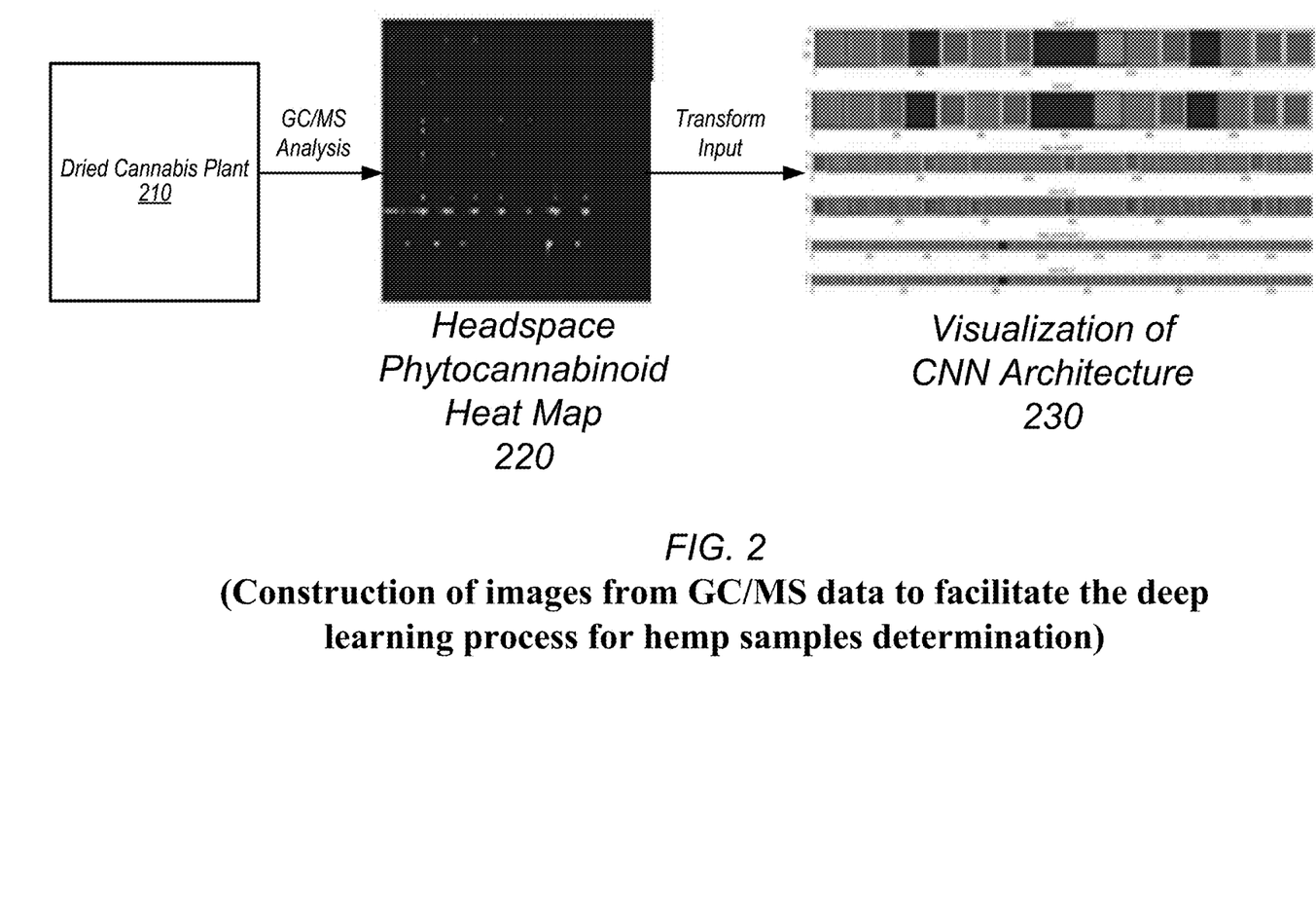
FIG. 2 depicts an example workflow for generating images from GC/MS data and using the images in a deep learning neural network.

FIG. 2 depicts an example workflow for generation of images from GC/MS data and using the images in a deep learning neural network. In the illustrated embodiment, GC/MS analysis is performed on dried *cannabis* plant 210. The GC/MS analysis data may include a transform of the chemical data into image data, represented by heat map 220. Heat map 220 may then be input and transformed through a CNN. A visualization of the CNN architecture is illustrated in 230.

In some embodiments, a build of a convolutional neural network (e.g., CNN 230) involves three convolutions operating on 3×3 windows, an ReLU (rectified linear unit), and max-pooling modules operating on 2×2 windows. The first convolution may extract 16 filters, the following one may extract 32 filters, and the last convolution may extract 64 filters. On top of the convolutions, two fully connected layers may be programmed, ending the network with sigmoid activation. For data preprocessing, two data generators, one for training and one for validation may be setup. In some embodiments, images are normalized for processing by the CNN using normalized pixel values. In various embodiments, the CNN is trained for 15 epochs and validated. The performance of the CNN may be visualized, for example, by plotting the accuracy and loss per epoch.

Figure 3:
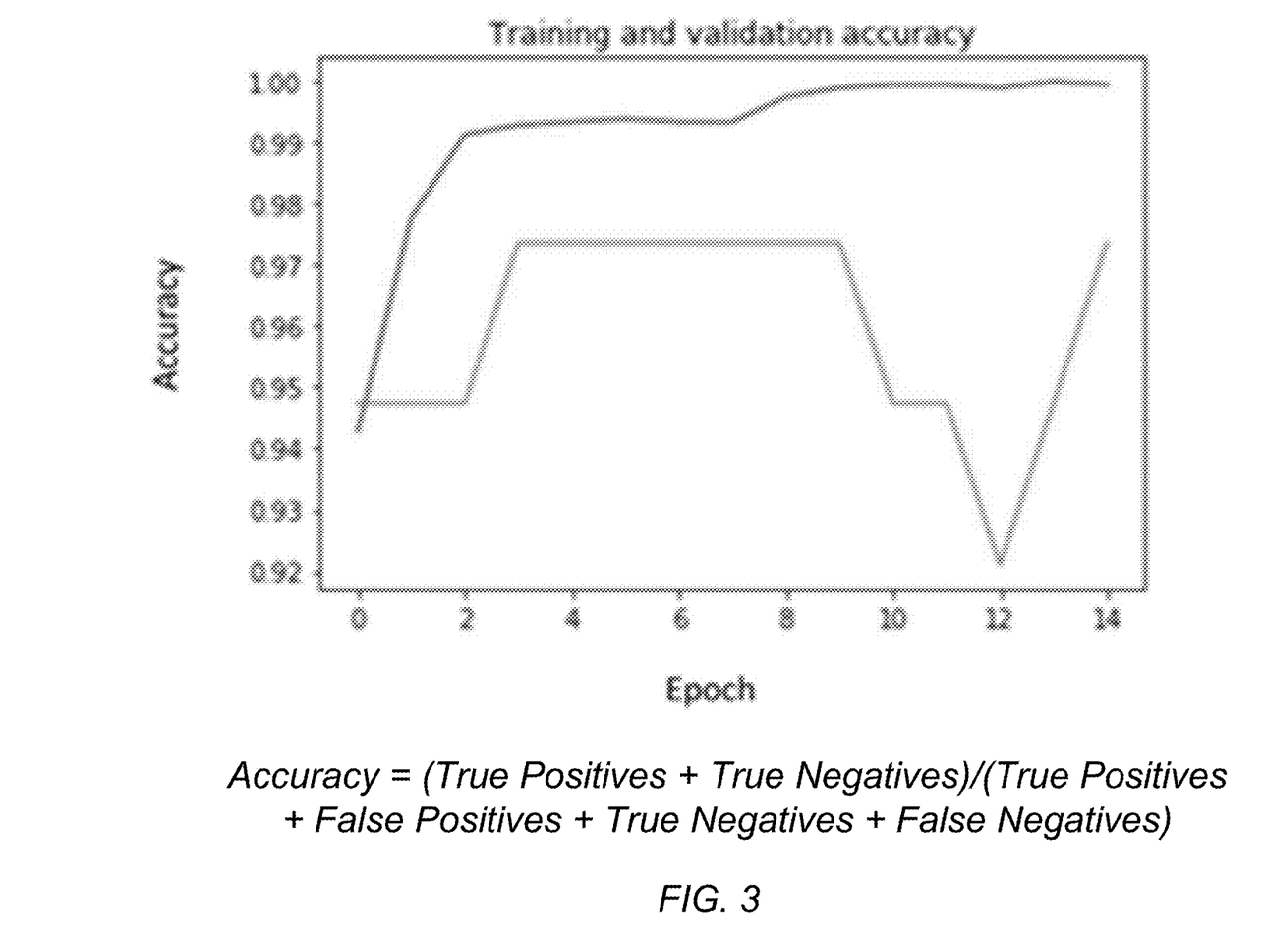
FIG. 3 depicts an example of a plot of accuracy versus loss per epoch.

FIG. 3 depicts an example of a plot of accuracy versus loss per epoch. In various embodiments, accuracy is defined as being the sum of (true positives and true negatives) divided by the sum of (true positives and false positives and true negatives and false negatives). As shown in FIG. 3, after 15 epochs of training for the CNN (AI) model, an embodiment of the algorithm can successfully determine hemp with more than 99% accuracy. The blue trace is training accuracy, and the orange trace is validation accuracy. It is noted that after 15 epochs, training accuracy and validation accuracy are both above 95%. The accuracy and validation metrics demonstrate that transformation of GC/MS data into images is implementable for a developed deep learning process to generate AI that may accurately assess *cannabis* samples. For instance, it may be possible that the trained AI model can provide accurate categorical decisions of hemp/non-hemp without the use of a cut-off value of 0.3% THC for hemp determination (as the AI model may determine hemp/non-hemp based on the images themselves without any calculated determination of the THC content).

In various embodiments, the chemical signatures captured by headspace chemical analysis (headspace-GC/MS) have excellent potential for hemp determination. For instance, headspace chemical analysis may capture chemical signatures for a differentiation between true marijuana (marijuana with THC and CBD) and placebo marijuana (marijuana samples with THC less than 0.01% and no CBD). In some embodiments, the AI model (e.g., CNN) may be fine-tuned by using ground-truth hemp samples. The accuracy of the AI model may also be verified with the ground-truth hemp samples and, in some embodiments, the precision of the model can be improved with a larger size training dataset. In various embodiments, once the AI model is established, different attributes, such as weather, geolocation, sophisticated growing operations, etc., can be added to the model for classification and association. In some contemplated embodiments, the headspace-GC/MS analytical testing platform described herein may be combined with new data sciences to offer a novel method for the statistical interpretation of evidence. Moreover, the entire testing process from chemical analysis to data processing may be automated and standardized.

Figure 4:
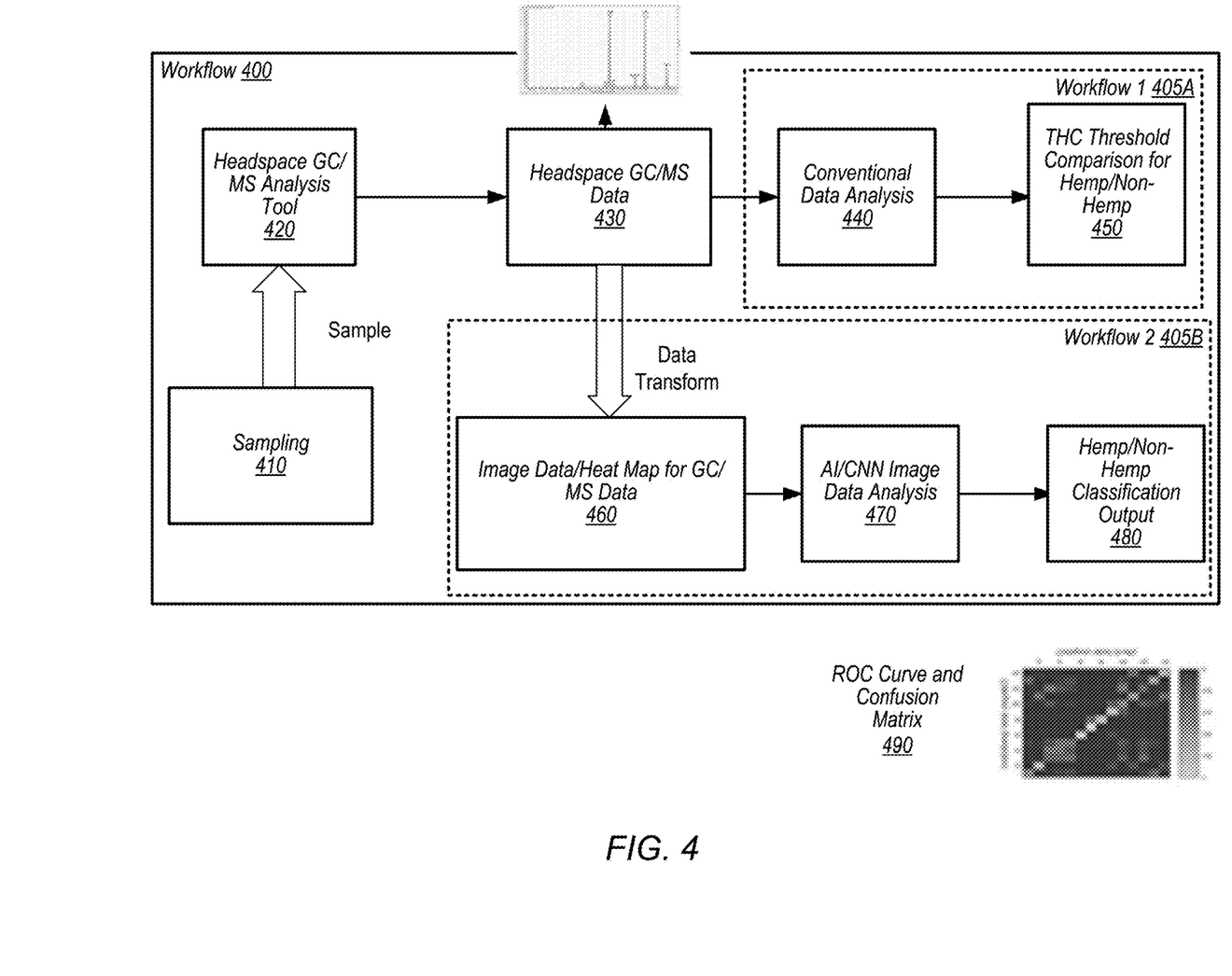
FIG. 4 depicts an example comparison of conventional laboratory testing workflow ("Workflow 1") and proposed AI workflow ("Workflow 2") for headspace-GC/MS analysis of hemp and marijuana determination using the embodiments described herein.

FIG. 4 depicts an example comparison of conventional laboratory testing workflow ("Workflow 1") and proposed AI workflow ("Workflow 2") for headspace-GC/MS analysis of hemp and marijuana determination using the embodiments described herein. In the illustrated embodiment, workflow 400 implements either workflow 1 405A (e.g., the conventional workflow) or workflow 2 405B (e.g., the AI/CNN workflow). Workflow 400 begins with collecting a sample in sampling in 410. The sample is then provided to headspace GC/MS Analysis tool 420. Tool 420 then generates headspace GC/MS data 430. Data 430 may be in a typical chromatogram format as shown above data 430.

In workflow 1 405A, conventional data analysis is conducted on data 430 in 440. Conventional data analysis 440 may include, for example, analysis of the signal versus concentration to determine THC concentration values in the sample. These THC concentration values may be compared to a THC threshold in 450 to determine whether the THC concentration in the sample is above or below the THC threshold (e.g., a THC cut-off value). This threshold comparison may determine whether the sample has a particular value of THC indicating *cannabis* (e.g., whether sample is hemp or non-hemp).

The present inventor has recognized that transformation of the GC/MS data 430 into an image data format, as described herein (e.g., into heat map format, shown in FIG. 2) in 460. In some embodiments, data 430 is transformed based on retention time, scan range, and signal intensities in data 430. Transformation into the image data format allows for artificial intelligence (AI) image data analysis in 470. In certain embodiments, image data analysis 470 includes implementation of a convolutional neural network (CNN), as described herein. The CNN image data analysis 470 may output, for example, a classification as to whether the sample is hemp or non-hemp. In various embodiments, accuracy of CNN image data analysis 470 may be determined based on a ROC curve and confusion matrix such as shown in 490.

Figure 5:
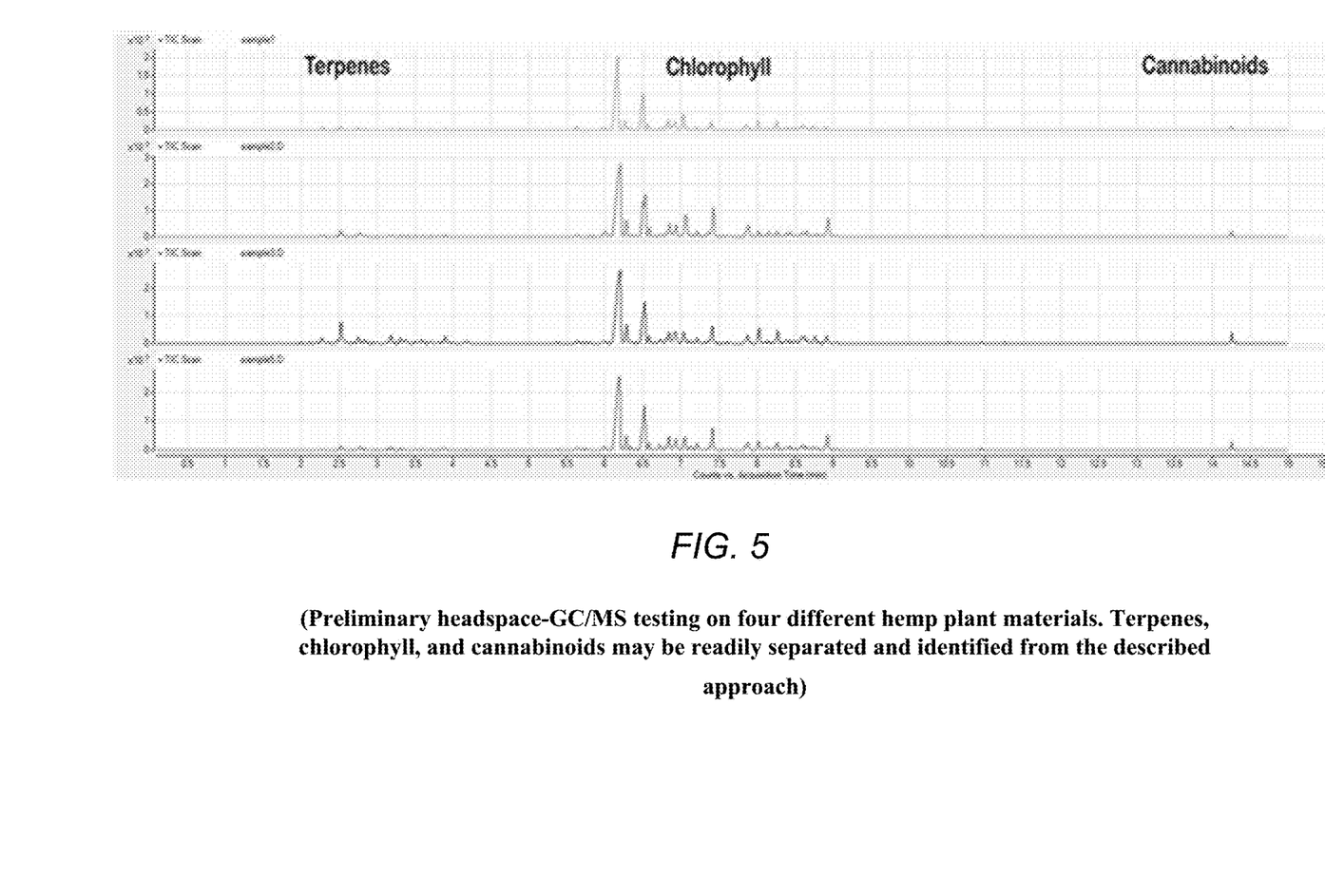
FIG. 5 depicts results of preliminary testing of four random hemp control samples.

In an experiment, four random hemp control samples provided were selected for preliminary testing of headspace-GC/MS analysis for hemp plant materials. FIG. 5 depicts results of preliminary testing of the four random hemp control samples. Approximately 40 mg hemp samples were placed in a 10 mL headspace vial. After heating the sample in the vial to 150° C. for 5 minutes, 250 µL headspace gas was sampled by an air-tight syringe for GC/MS analysis. As shown in FIG. 5, a general GC oven program heating from 50° C. to 300° C. could readily separate headspace chemicals within 15 minutes. The headspace sampling was capable of rapidly transferring cannabinoids for GC/MS analysis, as well as terpenes and chlorophyll from the plant materials.

Figure 6:
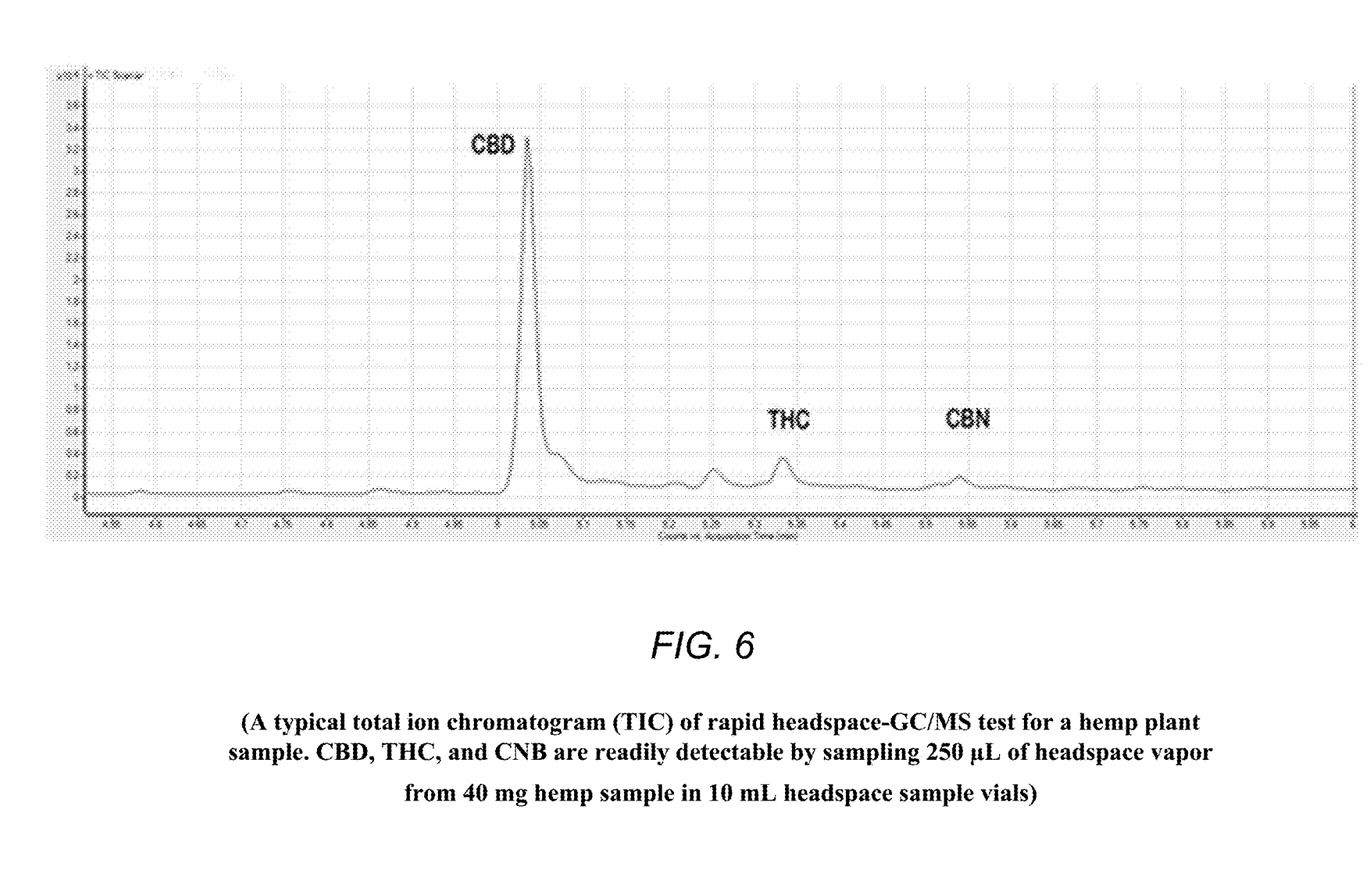
FIG. 6 depicts a preliminary result for the identification of THC and other cannabinoids from 250 µL of headspace gas samples.

In certain embodiments, headspace chemical analysis produces representative chemical features for the qualitative and quantitative chemical analysis of cannabinoids for marijuana plant materials. In various embodiments, direct headspace sampling provides the same degree of confidence for the determination of hemp and marijuana samples in a shorter amount of time than other typical analysis techniques. FIG. 6 depicts a preliminary result for the identification of THC and other cannabinoids from 250 μL of headspace gas samples. In this preliminary test, the GC oven was initially set at 150° C., then increased to 300° C. with a ramp of 25° C./min. As shown in FIG. 6, we can clearly detect THC, CBD, and CBN from sample headspace without solvent extraction. It should be noted also that the headspace-GC/MS method in this preliminary test was not yet optimized. In some contemplated embodiments, a sufficient resolution for THC and other cannabinoids may be reached with shortened GC/MS runtimes (e.g., less than 5 minutes). The chromatogram in FIG. 6 depicts the potential for the headspace-GC/MS approach. Additionally, preliminary data also demonstrates that cleaner headspace sampling of the cannabinoid from hemp samples may be achieved for the GC/MS testing workflow (e.g., "Workflow 2"), shown in FIG. 4.

Figure 7:
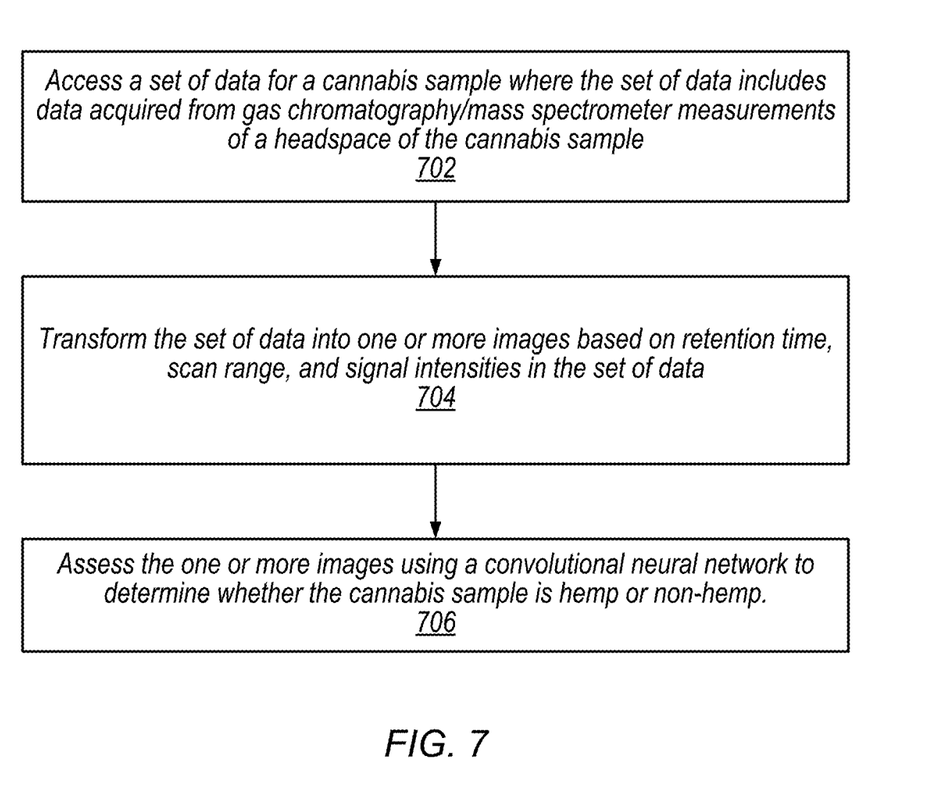
FIG. 7 is a flow diagram illustrating a method for assessing a *cannabis* sample, according to some embodiments

FIG. 7 is a flow diagram illustrating a method for assessing a *cannabis* sample, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 810, described below.

At 702, in the illustrated embodiment, a computer system accesses a set of data for a *cannabis* sample where the set of data includes data acquired from gas chromatography/mass spectrometer measurements of a headspace of the *cannabis* sample.

At 704, in the illustrated embodiment, the computer system transforms the set of data into one or more images based on retention time, scan range, and signal intensities in the set of data.

At 706, in the illustrated embodiment, the computer system assesses the one or more images using a convolutional neural network to determine whether the *cannabis* sample is hemp or non-hemp.

Example Computer System

Figure 8:
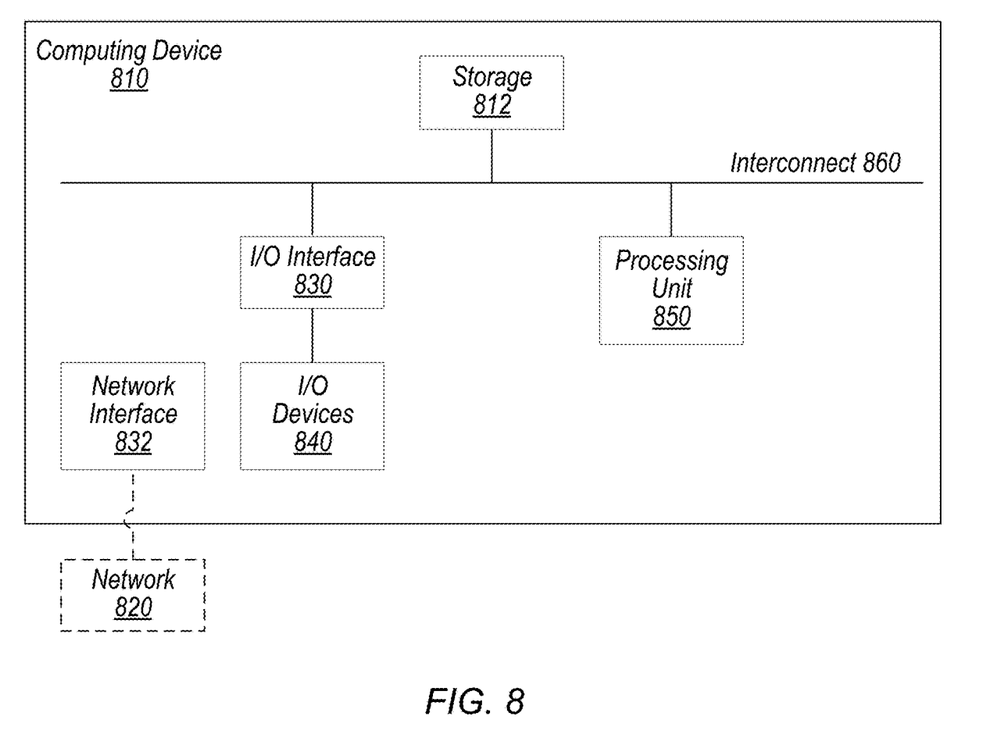
FIG. 8 is a block diagram of one embodiment of a computer system.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage 812 is usable by processing unit 850 (e.g., to store instructions executable by and data used by processing unit 850). Storage 812 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage 812 may consist solely of volatile memory, in one embodiment. Storage 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for hemp determination of a *cannabis* sample, comprising:
    measuring, by a gas chromatography/mass spectrometer device, a headspace gas associated with a *cannabis* sample to acquire a set of data for the headspace gas;
    accessing, by a computer system, the set of data for the headspace gas;
    transforming, by the computer system, the set of data for the headspace gas into one or more heat map images based on retention time, scan range, and signal intensities in the set of data, wherein the signal intensities are represented by heat signatures in the heat map images; and
    assessing the one or more heat map images using a convolutional neural network, wherein the convolutional neural network categorizes the *cannabis* sample associated with the headspace gas as being either hemp or non-hemp based on image data in the heat map images.

2. The method of claim 1, wherein transforming the set of data into one or more heat map images based on retention time, scan range, and signal intensities in the set of data includes mathematically transforming signals from the gas chromatography/mass spectrometer measurements of the headspace gas associated with the *cannabis* sample into the one or more heat map images.

3. The method of claim 1, wherein transforming the set of data into one or more heat map images based on retention time, scan range, and signal intensities in the set of data includes extracting retention time, scan range, and signal intensities from the set of data to generate the one or more heat map images.

4. The method of claim 3, wherein the signal intensity is normalized by an internal standard before generating the one or more heat map images.

5. The method of claim 1, wherein the convolutional neural network has been trained to recognize THC content in reference heat map images generated from gas chromatography/mass spectrometer measurements of headspace gas associated with *cannabis* samples.

6. The method of claim 5, wherein the reference heat map images include heat map images generated from ground-truth hemp data.

7. The method of claim 1, wherein the convolutional neural network has been trained to recognize chemical features representing hemp and non-hemp reference heat map images generated from gas chromatography/mass spectrometer measurements of headspace gas associated with *cannabis* samples.

8. The method of claim 1, wherein the accessing, transforming, and assessing are performed automatically by the computer system.

9. The method of claim 1, further comprising generating the headspace gas associated with the *cannabis* sample by rapid heating of the *cannabis* sample.

10. The method of claim 1, wherein the heat map images include heat maps corresponding to the set of data for the gas chromatography/mass spectrometer measurements of the headspace gas associated with the *cannabis* sample.

11. The method of claim 1, wherein the heat signatures in the heat map images correspond to signal intensities in the gas chromatography/mass spectrometer measurements of the headspace gas associated with the *cannabis* sample.

12. A system for hemp determination of a *cannabis* sample, the system comprising:
    a gas chromatography/mass spectrometer device for measuring a headspace gas associated with a *cannabis* sample;
    a computer system coupled to the gas chromatography/mass spectrometer device, wherein the computer system is operable to:
        access a set of data for the headspace gas associated with the *cannabis* sample, wherein the set of data includes data acquired from measurements of the headspace gas associated with the *cannabis* sample by the gas chromatography/mass spectrometer device;
        transform the set of data for the headspace gas into one or more heat map images based on retention time, scan range, and signal intensities in the set of data, wherein the signal intensities are represented by heat signatures in the heat map images; and
        analyze image data in the one or more heat map images using a convolutional neural network, wherein the convolutional neural network classifies the image data in the heat map images to determine whether a THC content of the *cannabis* sample associated with the headspace gas categorizes the *cannabis* sample as hemp or non-hemp.

13. The system of claim 12, wherein the computer system implements a mathematical transformation on signals in the set of data to generate the one or more heat map images.

14. The system of claim 12, wherein the convolutional neural network has been trained to recognize THC content in reference heat map images generated from gas chromatography/mass spectrometer measurements of headspace gas associated with *cannabis* samples.

15. The system of claim 14, wherein the reference heat map images include heat map images generated from ground-truth hemp data.

16. The system of claim 12, wherein the convolutional neural network has been trained to recognize chemical features representing hemp and non-hemp reference heat map images generated from gas chromatography/mass spectrometer measurements of headspace gas associated with *cannabis* samples.

17. The system of claim 12, wherein the computer system is operable to output the determination of the categorization of the *cannabis* sample as being hemp or non-hemp.

18. The system of claim 12, wherein the categorization of the *cannabis* sample is based on a threshold of THC content that differentiates between hemp and non-hemp *cannabis*.

* * * * *